(12) United States Patent
Nakai

(10) Patent No.: US 8,442,089 B2
(45) Date of Patent: May 14, 2013

(54) LASER DEVICE

(75) Inventor: Michihiro Nakai, Chiba (JP)

(73) Assignee: Fujikura Ltd., Tokyo (JP)

( * ) Notice: Subject to any disclaimer, the term of this patent is extended or adjusted under 35 U.S.C. 154(b) by 180 days.

(21) Appl. No.: 12/767,330

(22) Filed: Apr. 26, 2010

(65) Prior Publication Data

US 2010/0272128 A1    Oct. 28, 2010

(30) Foreign Application Priority Data

Apr. 28, 2009 (JP) .................. 2009-108751

(51) Int. Cl.
*H01S 3/091* (2006.01)

(52) U.S. Cl.
USPC .................. 372/70; 372/40; 372/41; 372/101

(58) Field of Classification Search .............. 372/70
See application file for complete search history.

(56) References Cited

U.S. PATENT DOCUMENTS

| 6,470,113 | B1 * | 10/2002 | Hwang et al. | 385/27 |
| 7,190,511 | B2 * | 3/2007 | Galvanauskas et al. | 359/341.1 |
| 7,535,634 | B1 * | 5/2009 | Savchenkov et al. | 359/346 |
| 2003/0118073 | A1 * | 6/2003 | Rockwell | 372/70 |

FOREIGN PATENT DOCUMENTS

| JP | 47-3512 | 1/1972 |
| JP | 5-275790 A | 10/1993 |
| JP | 2001-230476 A | 8/2001 |
| JP | 2008-187176 A | 8/2008 |

OTHER PUBLICATIONS

Japanese Office Action mailed on Feb. 5, 2013, issued in corresponding Japanese patent application No. 2009-108751, w/ English translation.

* cited by examiner

*Primary Examiner* — Xinning Niu

(74) *Attorney, Agent, or Firm* — Westerman, Hattori, Daniels & Adrian, LLP

(57) ABSTRACT

[Object] An object of the invention is to provide a laser device having high optical amplification efficiency.

[Solving Means] A laser device 100 includes: an optical fiber 20 which includes a core 21 and a clad 22 and through which seed light and pumping light propagate; and a glass rod 50 which is doped with rare earth elements, has a diameter larger than that of the core 21, wherein the seed light and the pumping light output from the optical fiber 20 are input to the glass rod 50 to have increased diameters, and output light including at least the amplified seed light is output from the glass rod 50.

4 Claims, 3 Drawing Sheets

[Fig. 1]
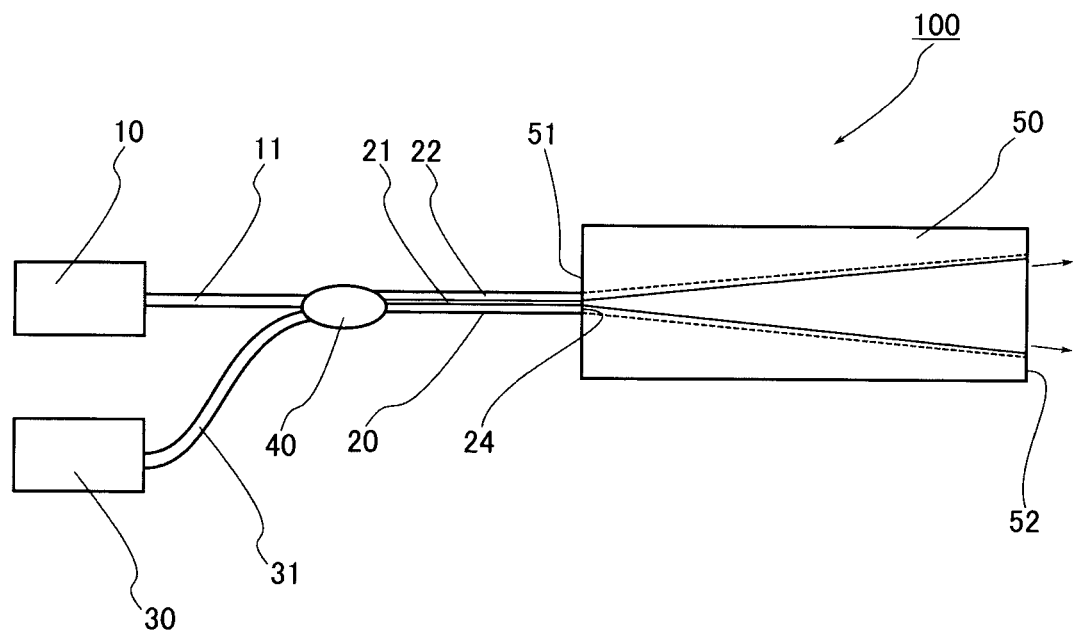
[Fig. 2]
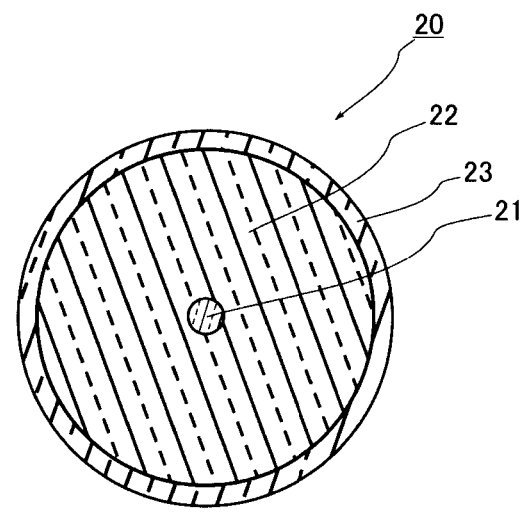

[Fig. 3]
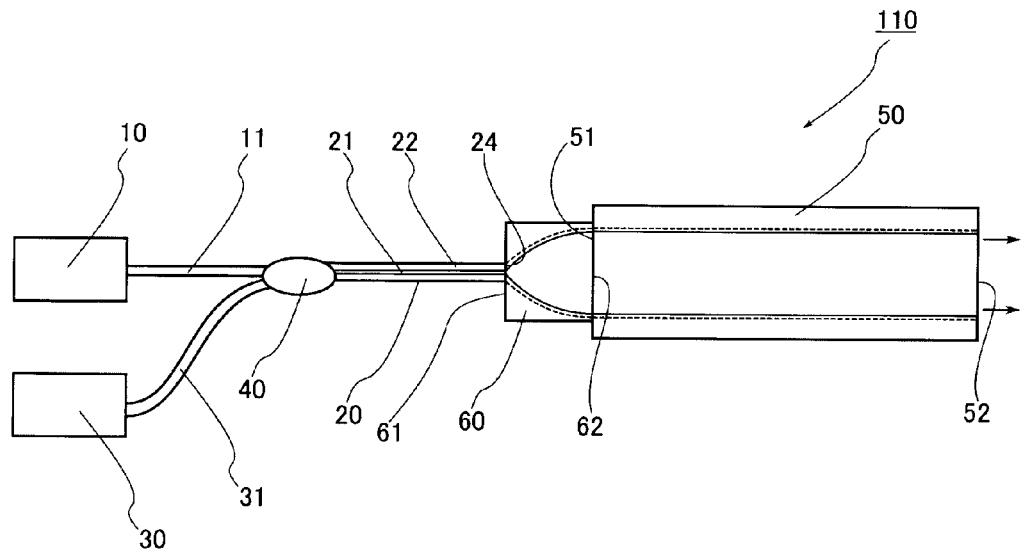
[Fig. 4]
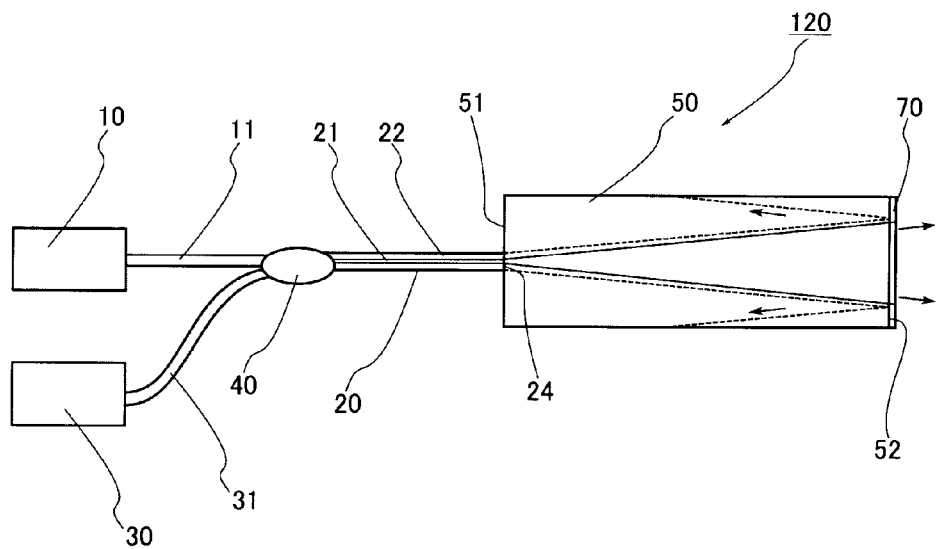

[Fig. 5]
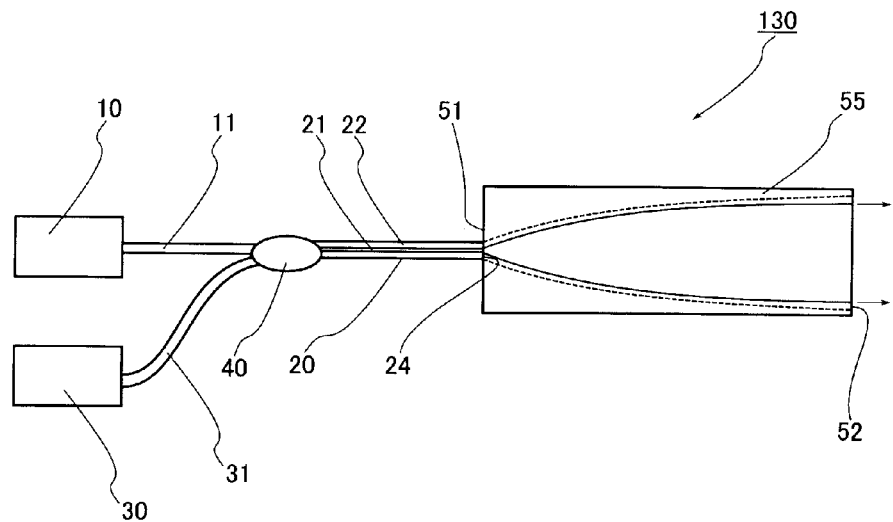
[Fig. 6]
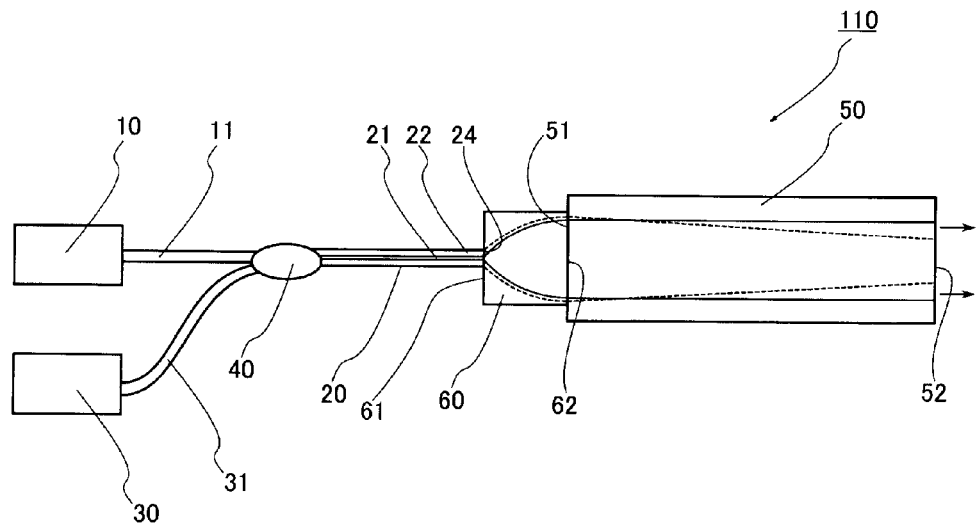

LASER DEVICE

TECHNICAL FIELD

The invention relates to a laser device, and particularly to a laser device having high optical amplification efficiency.

BACKGROUND ART

In a fiber laser device, laser light is amplified by an amplifying optical fiber doped with rare earth elements and the amplified laser light is output from an end of the amplifying optical fiber.

Patent Document 1 listed below discloses an example of fiber laser device. In this fiber laser device, an end cap configured by a glass rod having a diameter larger than a core of the amplifying optical fiber is fused to an output end of the amplifying optical fiber. The light amplified by the amplifying optical fiber is input to the end cap from the amplifying optical fiber, a diameter of the laser light spot is increased in the end cap, and the light is output from another end surface, which is located on the opposite side of the amplifying optical fiber, from the end cap. The laser beam, having increased its diameter is of decreasing power density, and, as a result, it could have less damage threshold for an output end surface.
Patent Document 1: U.S. Pat. No. 7,190,511

SUMMARY OF INVENTION

In a fiber laser device for amplifying light using an amplifying optical fiber as disclosed in Patent Document 1, an amplifying optical fiber is extended or pumping light having a higher power is input to the amplifying optical fiber in order to obtain large power of output light. However, when the amplifying optical fiber is extended or pumping light having a higher power is input to the amplifying optical fiber, there may be a nonlinear optical effect due to the increase of power concentration, whereby optical amplification efficiency may be lowered. This is because the nonlinear optical effect is more significant when the power concentration is higher and the fiber length is longer.

Therefore, an object of the invention is to provide a laser device having high optical amplification efficiency.

A laser device according to the invention includes: an optical fiber which includes a core and a clad and through which seed light and pumping light propagate; and a glass rod which is doped with rare earth elements has a larger diameter than that of the core, wherein the seed light and the pumping light output from the optical fiber are input to the glass rod, and the seed light have been amplified while the diameter of the seed light is increased, and output light including at least the amplified seed light is output from the glass rod.

In such a fiber laser device, diameters of seed light and pumping light output from the optical fiber and then input to the glass rod are increased by diffraction. Then, the pumping light excites rare earth elements in the glass rod, so that the seed light is amplified by stimulated emission caused by the excited rare earth elements. The seed light thus amplified is output through the output end surface of the glass rod as output light. Since the pumping light and the seed light propagate through the glass rod while diameters thereof are increased as described above, they pass large number of rare earth elements so that they can excite many rare earth elements and cause large stimulated emission. Therefore, a large gain can be obtained even with a short glass rod. In addition, since a diameter of the seed light is increased in the glass rod, the power concentration of the seed light on a cross-section perpendicular to the propagating direction of the light is decreased. Accordingly, the nonlinear optical effect can be suppressed in the glass rod. Specifically, the amplified light that is desired is prevented from being lost by that the wavelength of the seed light is converted by the nonlinear optical effect.

Since more stimulated emission can be caused in the glass rod with suppressing the nonlinear optical effect as described above, the seed light can be effectively amplified and then output.

It is preferable that the glass rod consist of a GRIN lens having the same length as odd multiple of 0.25 pitch defined by fluctuation of the seed light.

With the fiber laser device, seed light amplified and then output as output light can be collimated light. The spot size of seed light in the GRIN lens fluctuates periodically. This fluctuation defines a pitch of length for GRIN lens. Therefore, 0.25 pitch is a distance through which the seed light that has been input to the GRIN lens propagates to have the largest diameter.

It is more preferable that the glass rod have the same length as odd-multiples of 0.25 pitch defined as above.

With such a fiber laser device, variations of pitch for respective modes caused by mode dispersion can be suppressed even when the seed light has multiple modes.

It is further preferable that the diameter of the glass rod be larger than an outer diameter of the clad of the optical fiber in the laser device.

With such a fiber laser device, more pumping light can be input to the glass rod, and thus the seed light can be further amplified.

It is preferable that the optical fiber be fused to the glass rod in the laser device.

With such a fiber laser device, a splicing loss of light between the optical fiber and the glass rod is suppressed, and thus the seed light can be more effectively amplified.

A laser device according to the invention includes: an optical fiber which includes a core and a clad and through which seed light and pumping light propagate; a glass rod which is doped with rare earth elements has a larger diameter than that of the core; and a lens arranged between an input end surface of the glass rod and the optical fiber, wherein the seed light and the pumping light output from the optical fiber are input to the lens to have increased diameters and then output from the lens, and the seed light and the pumping light output from the lens are input to the glass rod, and output light including at least the amplified seed light is output from the grass rod.

With such a fiber laser device, the seed light and the pumping light input to the lens are made to have the diameters increased by the lens and then input to the glass rod. Accordingly, the number of the rare earth elements in the glass rod is large, and the pumping light are more absorbed and the seed light is amplified more. Therefore, a large gain can be obtained even with a short glass rod. In addition, power concentration of the seed light at a cross-section perpendicular to a propagating direction of light in the glass rod is decreased. Accordingly, the nonlinear optical effect can be suppressed in the glass rod. Specifically, the amplified light that is desired is prevented from being lost by that the wavelength of the seed light is converted by the nonlinear optical effect.

As described above, more stimulated emission can be caused in the glass rod, and thus the nonlinear optical effect can be suppressed. Therefore, the seed light can be effectively amplified and output.

In the laser device, at least the amplified seed light may be output from the lens as collimated light.

In the laser device, the lens may be configured by a GRIN lens having the same length as odd multiple of 0.25 pitch defined by fluctuation the seed light.

In the laser device, it is preferable that the lens be configured by a GRIN lens having the same length as 0.25 pitch defined by fluctuation of the seed light.

With such a configuration, variations of pitch for respective modes caused by mode dispersion can be suppressed even when the seed light has multiple modes.

It is preferable that the lens be fused to at least one of the glass rod and the optical fiber.

With such a configuration, a loss of light between the lens and the optical fiber or between the lens and the glass rod is suppressed compared to a case where a gap exists between the optical fiber and the lens and between the glass rod and the lens, and thus the seed light can be more effectively amplified.

It is preferable that the seed light output from the lens be input to the glass rod in parallel to a longitudinal direction of the glass rod.

With such a fiber laser device, at least the seed light can be collimated light and input to the glass rod in parallel to the longitudinal direction of the glass rod as described above. Accordingly, the seed light input from the input end surface of the glass rod can be prevented from being partially reflected at the side surface of the glass rod and from partially leaking through the side surface, and thus loss of the seed light can be suppressed regardless of the length of the glass rod. Therefore, even if the length of the glass rod varies upon manufacturing laser devices, an acceptable range of variations is improved so that the productivity of laser devices is improved.

In the laser device, it is suitable that an optical filter which reflects the pumping light and transmits the output light is provided on an output end surface of the glass rod.

With such a configuration, the output light output from the output end surface of the glass rod is transmitted through the optical filter so as to be output. On the other hand, the pumping light is reflected by the optical filter so as to propagate through the glass rod again. Accordingly, the seed light is amplified by the pumping light input through the input end surface and by the pumping light reflected by the optical filter, and thus the seed light can be more effectively amplified.

According to the invention, a laser device having a high optical amplification efficiency can be provided as described above.

BRIEF DESCRIPTION OF THE DRAWINGS

FIG. 1 is a view showing a laser device according to a first embodiment of the invention.

FIG. 2 is a view showing a structure of a cross-section perpendicular to a longitudinal direction of the optical fiber shown in FIG. 1.

FIG. 3 is a view showing a laser device according to a second embodiment of the invention.

FIG. 4 is a view showing a laser device according to a third embodiment of the invention.

FIG. 5 is a view showing a laser device according to a fourth embodiment of the invention.

FIG. 6 is a view showing a variant laser device according to the second embodiment of the invention.

BEST MODE FOR CARRYING OUT THE INVENTION

Suitable embodiments of a laser device according to the invention will be explained hereinafter referring to the drawings.

First Embodiment

FIG. 1 is a view showing a laser device according to a first embodiment of the invention.

As shown in FIG. 1, a laser device 100 includes, as main components: a seed light source 10 configured to output seed light; an pumping light source 30 configured to output pumping light; an optical fiber 20 into which the seed light and the pumping light are input; an optical coupler 40 configured to input the seed light and the pumping light to the optical fiber 20; and a glass rod 50 to which the seed light and the pumping light output from the optical fiber 20 are input.

The seed light source 10 may be configured by a laser light source including a laser diode or a fiber laser device of fabry-perot type or fiber-ring type, for example. The seed light output from the seed light source 10 may be pulse light having a wavelength of 1064 nm, for example, but not particularly limited thereto. The seed light source 10 is connected to a fiber for propagation of seed light 11 configured by a core and a clad coating the core. The seed light output from the seed light source 10 propagates through the core of the fiber for propagation of seed light 11. The fiber for propagation of seed light 11 may be a single mode fiber, for example, in which case the seed light propagates through the fiber for propagation of seed light 11 as single mode light.

The pumping light source 30 may be configured by a laser diode and output the pumping light having a wavelength of 976 nm, for example, when the wavelength of the seed light output from the seed light source 10 is 1064 nm. The pumping light source 30 is connected to a fiber for propagation of pumping light 31 and the pumping light output from the pumping light source 30 propagates through the fiber for propagation of pumping light 31. The fiber for propagation of pumping light 31 may be a multi mode fiber, for example, in which case the pumping light propagates through the fiber for propagation of pumping light 31 as multi mode light. The pumping light source 30 may be configured by a plurality of (six, for example) laser diodes. In this case, fibers for propagation of pumping light 31 of the same number as the number of the laser diodes are used and each of the laser diodes is connected to each of the fibers for propagation of pumping light 31.

The fiber for propagation of seed light 11 and the fiber for propagation of pumping light 31 are connected to the optical fiber 20 at the optical coupler 40.

FIG. 2 is a view showing a structure of a cross-section perpendicular to a longitudinal direction of the optical fiber 20. As shown in FIG. 2, the optical fiber 20 is configured by a double clad fiber. Specifically, the optical fiber 20 includes: a core 21 provided at the center of the optical fiber 20; a clad 22 coating the core 21; and a plastic clad 23 coating the clad 22. The core 21 is configured to have a larger refractive index than the clad 22 and the plastic clad 23 is configured to have a smaller refractive index than the clad 22. A diameter of the core 21 is 10 μm, for example, but not particularly limited thereto. An outer diameter of the clad 22 is 125 μm, for example, but not particularly limited thereto. An outer diameter of the plastic clad 23 is 150 μm, for example, but not particularly limited thereto. The first optical fiber 20 can allow the seed light having a wavelength of 1064 nm, for example, to propagate through the core 21 as single mode light and allow the pumping light having a wavelength of 976 nm to propagate through the clad 22 as multi mode light. In FIG. 1, the plastic clad 23 is not illustrated.

The glass rod 50 is formed of silica glass uniformly doped with rare earth elements. The glass rod 50 is formed in a cylindrical shape having an input end surface 51 and an output end surface 52 and formed to have a larger diameter than that of the core 21 of the optical fiber 20. An end surface 24 of the optical fiber 20 is fused to the input end surface 51 of the glass rod 50 in such a manner that the center axes of the glass rod 50 and the optical fiber 20 coincide. In this embodiment, the glass rod 50 is configured to have a diameter of 400 μm and a length of 3 mm, for example. It is preferable that the diameter and the length of the glass rod 50 be appropriately selected so that the seed light expanded in the rod does not reach the edge between the glass rod and the outside in the area through which the seed light propagates before being radiated.

Next, optical paths and an optical amplification of the seed light and the pumping light in the laser device 100 will be explained.

The seed light output from the seed light source 10 propagates through the fiber for propagation of seed light 11, is input to the optical fiber 20 at the optical coupler 40 and propagates through the core 21 of the optical fiber 20. The pumping light output from the pumping light source 30 propagates through the fiber for propagation of pumping light 31, is input to the optical fiber 20 at the optical coupler 40 and propagates mainly through the clad 22 of the optical fiber 20.

The seed light and the pumping light having propagated through the optical fiber 20 are output from the end surface 24 of the optical fiber 20 and then input to the glass rod 50 through the input end surface 51. At this time, diameters of the seed light and the pumping light input to the glass rod 50 are increased since the diameter of the glass rod 50 is made larger than that of the core 21 of the optical fiber 20. In this specification, a solid line shows a path of the seed light and a broken line shows a path of the pumping light.

Then, in the glass rod 50, rare earth elements in the glass rod 50 are excited by the pumping light. The excited rare earth elements cause a stimulated emission and the seed light is amplified. The thus amplified seed light while the diameter thereof being increased is output as output light through the output end surface 52 of the glass rod 50 as shown by arrows in FIG. 1.

It is preferable that a relationship between a refractive index Nc of the core 21 of the optical fiber 20, a refractive index Nr of the glass rod 50 and a gain Gr of the glass rod 50 satisfy the following equation:

$$(Nc-Nr)/(Nc+Nr)<1/Gr.$$

When such a relationship is satisfied, unnecessary oscillation due to spontaneous emission light radiated by the rare earth elements in the glass rod 50, reflected at the end surface 24 of the optical fiber 20, and amplified in the glass rod can be suppressed.

As explained above, according to the laser device 100 of the this embodiment, the pumping light and the seed light propagate through the glass rod 50 while the diameters thereof being increased in the glass rod 50. Therefore, the number of rare earth elements passed through by the pumping light and the seed light is large, and thus it is possible to excite more rare earth elements to cause more stimulated emission. Therefore, a large gain can be obtained even with a short glass rod.

In addition, since the diameter of the seed light is increased in the glass rod 50, power concentration of the seed light at a cross-section perpendicular to a propagating direction of light in the glass rod 50 is decreased. Accordingly, the nonlinear optical effect can be suppressed in the glass rod 50. Specifically, the amplified light that is desired is prevented from being lost by conversion, due to the nonlinear optical effect, of energy of the seed light into light having a wavelength different from that of the light desired to be output.

As described above, more stimulated emission can be caused in the glass rod 50 and the nonlinear optical effect can be suppressed, whereby the seed light can be effectively amplified and output through the output end surface 52 as output light.

In the laser device 100 of this embodiment, the seed light is amplified after being output from the optical fiber 20. Accordingly, the power concentration at the end surface 24 of the optical fiber 20 is low. Therefore, damage on the end surface 24 of the optical fiber 20 when the seed light is output through the end surface 24 of the optical fiber 20 (momentary damage due to the peak power of light, for example) can be suppressed.

Further, since the end surface 24 of the optical fiber 20 is fused to the input end surface 51 of the glass rod 50 in this embodiment, a loss of light between the optical fiber 20 and the glass rod 50 is suppressed, and thus the seed light can be more effectively amplified.

Here, the glass rod 50 is made to have a diameter larger than that of the core 21 of the optical fiber 20. However, it is preferable that the glass rod 50 be made to have a diameter larger than the outer diameter of the clad 22 of the optical fiber 20. When the glass rod 50 has a diameter larger than the outer diameter of the clad 22 of the optical fiber 20, the pumping light that has propagated through the core 21 and the clad 22 of the optical fiber 20 can effectively propagate through the glass rod 50.

Second Embodiment

Next, a second embodiment of the invention will be explained in detail referring to FIG. 3. Here, components that are identical or similar to those in the first embodiment are indicated by the same reference numerals and the same explanation will not be repeated unless otherwise particularly mentioned.

FIG. 3 is a view showing a laser device according to the second embodiment of the invention. As shown in FIG. 3, a laser device 110 is different from the laser device 100 of the first embodiment in that the laser device 110 is provided with a lens 60 between the optical fiber 20 and the glass rod 50.

The lens 60 is configured by a GRIN lens in a cylindrical shape. Specifically, the lens 60 is configured to have a refractive index distribution in the diameter direction and not to have a refractive index distribution in the length direction, and configured to have the refractive index larger toward the center in the diameter direction and smaller at a portion closer to the side surface thereof, so that the refractive index gradually varies from the center to the side surface. Therefore, light input to the lens 60 is refracted at the center portion of the lens 60.

The lens 60 is made to have the same length as odd multiple of 0.25 pitch defined by fluctuation of the seed light. Accordingly, the seed light input to the glass rod 50 is output from the glass rod 50 as collimated light. It is preferable that the lens 60 be made to have the same length as odd multiple of 0.25 pitch defined by fluctuation of the seed light from the viewpoint of suppressing variations of pitch for respective modes caused by mode dispersion and the viewpoint of making the length of the lens 60 short. In this embodiment, the lens 60 is configured to have a diameter of 500 μm and a length of 1.7 mm, and the glass rod 50 is configured to have a diameter of 800 μm and a length of 10 mm, for example.

An end surface 61 of the lens 60 on a side of the optical fiber 20 is fused to the end surface 24 of the optical fiber 20 in such a manner that the center axes of the lens 60 and the optical fiber 20 coincide or that the centers of the lens 60 and the optical fiber 20 are eccentric within a range of 5% of the diameter of the lens 60. In addition, an end surface 62 of the lens 60 on a side of the glass rod 50 is fused to the input end surface 51 of the glass rod 50 in such a manner that the center axes of the lens 60 and the glass rod 50 coincide or the center axes are in parallel.

In the laser device 110, the seed light and the pumping light output from the optical fiber 20 and input to the lens 60 are output with increased diameters through the end surface 62 of the lens 60 in parallel to the longitudinal direction of the glass rod 50. At this time, since the lens 60 has the same length as odd multiple of 0.25 pitch defined by fluctuation of the seed light, the seed light is output as collimated light. The seed light and the pumping light output from the lens 60 with increased diameters are input to the glass rod through the input end surface 51 of the glass rod 50 and propagates through the glass rod 50. The pumping light propagating through the glass rod 50 excites rare earth elements, so that the seed light is amplified by stimulated emission caused by the excited rare earth elements and output as output light through the output end surface 52.

It is preferable that a relationship between a refractive index Ng (the refractive index Ng is either one having larger difference from Nr, of a refractive index N1 of a portion close to center having the highest refractive index and a refractive index N2 of a portion close to a side surface having the lowest refractive index) of the lens 60, a refractive index Nr of the glass rod 50 and a gain Gr of the glass rod 50 satisfy the following equation:

$$(Ng-Nr)/(Ng+Nr)<1/Gr.$$

When such a relationship is satisfied, unnecessary oscillation due to spontaneous emission light radiated by the rare earth elements in the glass rod 50, reflected at the end surface 62 of the lens 60, and amplified in the glass rod can be suppressed.

In the laser device 110 of this embodiment, the seed light and the pumping light input to the lens 60 are made to have the diameters increased by the lens 60 and then input to the glass rod 50 as described above. Accordingly, the number of the rare earth elements, through which the seed light and the pumping light pass, is large in the glass rod 50 so that more stimulated emission can be caused. Therefore, a large gain can be obtained even with a short glass rod 50. In addition, power concentration of the seed light at a cross-section perpendicular to a propagating direction of light in the glass rod 50 is decreased. Accordingly, the nonlinear optical effect can be suppressed in the glass rod 50. Specifically, the amplified light that is desired is prevented from being lost by conversion, due to the nonlinear optical effect, of energy of the seed light into light having a wavelength different from that of the light desired to be output.

Since more stimulated emission can be caused in the glass rod 50 of this embodiment as described above, the nonlinear optical effect can be suppressed, and thus the seed light can be effectively amplified and output as output light through the output end surface 52.

In addition, the seed light is output from the lens in parallel to the longitudinal direction of the glass rod 50 to be collimated light and then input to the glass rod 50. Accordingly, the seed light can be prevented from being reflected at the side surface of the glass rod 50 and from leaking through the side surface, and thus loss of the seed light in the glass rod 50 can be suppressed regardless of the length of the glass rod 50. Therefore, even if the length of the glass rod varies upon manufacturing laser devices, an acceptable range of variations is improved so that the productivity of laser devices is improved.

In addition, the lens 60 is a GRIN lens and the lens 60 is fused to the end surface 24 of the optical fiber 20 and the input end surface 51 of the glass rod. Therefore, a loss of light between the lens 60 and the optical fiber 20 or between the lens 60 and the glass rod 50 is suppressed compared to a case where a gap exists between the optical fiber 20 and the lens 60 and between the glass rod 50 and the lens 60.

Third Embodiment

Next, a third embodiment of the invention will be explained in detail referring to FIG. 4. Here, components that are identical or similar to those in the first embodiment are indicated by the same reference numerals and the same explanation will not be repeated unless otherwise particularly mentioned.

FIG. 4 is a view showing a laser device according to the third embodiment of the invention. As shown in FIG. 4, a laser device 120 is different from the laser device 100 of the first embodiment in that the laser device is provided with an optical filter 70 on the output end surface 52 of the glass rod 50.

The optical filter 70 is configured to transmit light having a wavelength same as the seed light and to reflect light having a wavelength same as the pumping light. The optical filter 70 may be configured by a multilayer dielectric filter formed by alternately layering materials of different refractive indexes. Materials that may be used for the multilayer dielectric filter include silica ($SiO_2$), titanium oxide ($TiO_2$), tantalum oxide ($Ta_2O_5$), zirconia ($ZrO_2$), and the like.

According to the laser device 120 of this embodiment, the seed light is transmitted through the optical filter 70 at the output end surface 52 of the glass rod 50 so as to be output and the pumping light is reflected by the optical filter 70 so as to propagate through the glass rod 50 again. Accordingly, the seed light is amplified by the pumping light input through the input end surface 51 together with the seed light and by the pumping light reflected by the optical filter 70. Therefore, the seed light can be effectively amplified and output as output light.

Fourth Embodiment

Next, a fourth embodiment of the invention will be explained in detail referring to FIG. 5. Here, components that are identical or similar to those in the first embodiment are indicated by the same reference numerals and the same explanation will not be repeated unless otherwise particularly mentioned.

FIG. 5 is a view showing a laser device according to the fourth embodiment of the invention. As shown in FIG. 5, a laser device 130 is different from the laser device 100 of the first embodiment in that the glass rod 50 is replaced by a glass rod 55 configured by a GRIN lens doped with rare earth elements.

The glass rod 55 has a shape similar to that of the glass rod 50 and is formed of silica doped with rare earth elements entirely. The glass rod 55 is configured to have a refractive index distribution in the diameter direction and not to have a refractive index distribution in the length direction, and configured to have the refractive index larger toward the center in the diameter direction and smaller at a portion closer to the side surface thereof, so that the refractive index gradually varies from the center to the side surface. In order to configure a glass rod having a refractive index larger toward the center, a dopant increasing the refractive index is doped with higher concentration toward the center, or a dopant decreasing the refractive index is doped with higher concentration toward the side surface. Therefore, light input to the glass rod 55 is refracted at the center portion of the glass rod 55.

In this embodiment, the glass rod 55 is made to have the same length as odd multiple of 0.25 pitch defined by fluctuation of the seed light. Accordingly, the seed light input to the glass rod 55 is output from the glass rod 55 as collimated light. It is preferable that the glass rod 55 be made to have the same length as odd multiple of 0.25 pitch defined by fluctuation of the seed light from the viewpoint of suppressing variations of pitch for respective modes caused by mode dispersion and the viewpoint of making the length of the glass rod 55 short.

The connection between the glass rod 55 and the optical fiber 20 is made similarly to the connection between the glass rod 50 and the optical fiber 20 in the first embodiment.

According to the laser device 130 of this embodiment, the glass rod 55 is configured by a GRIN lens and is made to have the same length as odd multiple of 0.25 pitch defined by fluctuation of the seed light, so that output light can be collimated light.

Although the invention has been described above by reference to certain embodiments as examples, the invention is not limited thereto.

For example, in the laser devices 100, 110, 120 and 130 of the respective embodiments, the glass rods 50 and 55 are formed of silica glass doped with rare earth elements entirely uniformly; however, the glass rods 50 and 55 may be doped with rare earth elements with a higher concentration toward the center axes of the glass rods. Light having an increased diameter tends to have a higher intensity toward an optical axis. Accordingly, the seed light in the glass rods 50 and 55 also tends to have a higher intensity toward the optical axis. Therefore, the seed light can be more effectively amplified by configuring the glass rods 50 and 55 to have rare earth elements with a higher concentration toward the center axes to which the seed light having a higher intensity is input.

In addition, in the second embodiment, a diameter of the pumping light that has been output from the lens 60 may be gradually decreased in the glass rod 50 as shown in FIG. 6. As described above, the seed light having an increased diameter tends to have a higher intensity toward an optical axis. Therefore, the seed light can be effectively amplified by collecting the pumping light to a portion where the seed light having a high intensity passes.

In each of the laser devices 110 and 130 of the second and fourth embodiments, an optical filter configured to transmit light having a wavelength same as the seed light and to reflect light having a wavelength same as the pumping light may be provided on the output end surface 52. In this case, the specific configuration of the optical filter is the same as that of the optical filter 70 in the laser device 120 of the third embodiment.

In each of the first, third and fourth embodiments, the end surface 24 of the optical fiber 20 is fused to either of the glass rod 50 or 55; however, the invention is not limited thereto and a gap may be provided between the optical fiber 20 and the glass rod 50 and between the optical fiber 20 and the glass rod 55. It is preferable that anti-reflection coating be applied to the end surface 24 of the optical fiber 20 and the input end surfaces 51 of the glass rods 50 and 55.

Similarly, in the second embodiment, a gap may be provided between the optical fiber 20 and the lens 60 and between the lens 60 and the glass rod 50. Also in this case, it is preferable that anti-reflection coating be applied to the end surface 24 of the optical fiber 20, the input end surface 51 of the glass rod 50, and the end surfaces 61 and 62 of the lens 60.

According to the invention, a laser device having a high optical amplification efficiency can be provided.

The invention claimed is:

1. A laser device comprising:
   an optical fiber which includes a core and a clad surrounding the core and through which a seed light and a pumping light propagate; and
   a glass rod which is disposed at one end of the optical fiber, doped with rare earth elements and has a larger diameter than that of the core wherein the glass rod includes an input end surface and an output end surface opposite to the input end surface,
   wherein the seed light and the pumping light output from the optical fiber are input to the glass rod at the input end surface,
   wherein the glass rod is configured by a GRIN lens having the same length, between the input end surface and the output end surface, as odd multiple of 0.25 pitch defined by fluctuation of the seed light,
   wherein the seed light is amplified while the diameter of the seed light is increased, and
   wherein output light including at least the amplified seed light with the increased diameter is output from the glass rod at the output end surface.

2. The laser device according to claim 1, wherein the glass rod has the same length as 0.25 pitch defined by fluctuation of the seed light.

3. The laser device according to any one of claims 1 or 2, wherein the diameter of the glass rod is larger than an outer diameter of the clad of the optical fiber.

4. The laser device according to claim 1, wherein the optical fiber is fused to the glass rod.

* * * * *